Patented May 29, 1928.

1,671,316

UNITED STATES PATENT OFFICE.

THOMAS G. RICHARDS, OF CAMBRIDGE, AND GEORGE P. F. SMITH, OF NEWTON, MASSACHUSETTS, ASSIGNORS, BY MESNE ASSIGNMENTS, TO DISPERSIONS PROCESS, INC., OF DOVER, DELAWARE, A CORPORATION OF DELAWARE.

METHOD OF RECLAIMING AND DISPERSING VULCANIZED RUBBER.

No Drawing. Application filed May 17, 1927. Serial No. 192,157.

The object of this invention is to provide a process of reclaiming vulcanized rubber to produce a product, which, upon manipulation in the presence of water, will invariably be dispersed therein in fine particle size, and which may be recoagulated by the use of acetic acid or other suitable coagulant.

There are various established and well-known processes for reclaiming vulcanized rubber of which that known as the "alkali process" is frequently employed. This involves the digestion of the vulcanized rubber, usually in granular or disintegrated form, with caustic soda or potash, or a combination of these caustic alkalis, at elevated temperatures and pressures, and results in a product which is workable in plastic condition on a standard compounding mill and with which crude rubber, sulphur, fillers or pigments, vulcanization accelerators, softeners and other compounding ingredients may be and are usually mixed or compounded. In some cases, where the waste or scrap vulcanized rubber includes fabrics, the latter is removed by the use of acids or other suitable means; and in other cases where no fabrics are present the reclaiming is sometimes carried out by the addition of an oil to the finely ground scrap, and by the treatment of the mixture in an autoclave with either dry heat or steam.

We have found that, if in the process of reclaiming rubber there be mixed or compounded with the raw waste or scrap vulcanized rubber a sufficient proportion of a saponifiable material and an alkali to ensure in the final product the formation and retention of the necessary quantity of soap, a reclaimed or so-called "devulcanized" rubber results, which without the employment of an additional dispersing agent may be dispersed in water in particles of ultra fineness. The product produced by the reclaiming process, in addition to its property of dispersion by mere manipulation with water, possesses all of the valuable characteristics of the standard reclaimed rubber, and may be employed in lieu thereof for all the purposes for which the standard reclaimed rubber is used.

In practicing our process, the same procedure may be followed which is ordinarily practiced in reclaiming vulcanized rubber by the alkali method, except that there is mixed with the scrap or waste rubber a sufficient quantity of a saponifiable ingredient, which will react with the alkali to produce a soap in situ uniformly distributed throughout the mass, capable of acting as the dispersing agent to permit the dispersion of the mass in water. As the saponifiable agent, any fatty acid or compounds or esters thereof may be employed, such as acid resins, resin oil or resin distillates, pine tar, stearic or oleic acids, glycerides or esters of the fatty-acids, or their equivalents, which will react with the alkali, at the usual temperatures and pressures employed in the alkali reclaiming of vulcanized rubber, to produce a soap in situ, capable of acting as a dispersing agent for the mass in which it is incorporated and distributed.

If the vulcanized rubber scrap has been previously treated or digested with an acid, it is preferably washed, and is then digested with an alkali sufficient to neutralize any residual acid, and to react with an added saponifiable agent to produce soap in situ in the mass, of which sufficient remains after the usual steps of washing, drying, straining and sheeting to permit the reclaimed rubber to be dispersed merely by its proper manipulation in the presence of water.

By way of example, but without limitation thereto, in carrying out our process one may proceed as follows. Ground "automobile stock," prepared in the manner commonly practiced for reclaiming by the alkali process, is introduced into a rotary autoclave with the usual proportion of caustic soda (e. g. 4% to 12% based on weight of rubber stock) dissolved in water; but in addition thereto there is placed in the autoclave 10% of resin oil (e. g. one containing about 40% to 45% of saponifiable matter). There is, if desired, and indeed preferably, added a sufficient quantity of a suitable softener to ensure the production of a plastic or workable mass on completion of the reclaiming process, and for this purpose we usually employ "cumar", though any other suitable or usual softener may be substituted therefor. If the softener contains or comprises saponifiable matter, the proportion of the resin oil is decreased, since the resulting soap need not exceed 5% of the final product to function in the step of dispersing the product in water. The autoclave is then closed and placed in operation, and the contents are subjected to the usual elevated temperatures of 140°-200° C. and the corresponding elevated pressures, by the use of steam, for the usual periods of digestion. Upon the completion of the digestion during which the saponifiable agent reacts with the alkali to form a soap in situ and the soap is uniformly distributed throughout the mass, the resulting product is withdrawn from the autoclave, and subjected to the usual refining operations, e. g., washing, straining, drying and sheeting,—care being taken not to wash or remove from the product the amount of soap required for the final operation of dispersion in water. One of the advantages, incident to the addition of the cumar or other equivalent softener to the rubber stock to be digested therewith, is to ensure the retention in the resultant plastic product, during the washing operation, of a sufficient proportion of the soap, say 5% of the total mass, to function as a dispersing agent. The dried and sheeted reclaimed rubber is in a form in which it may be sold commercially like any other reclaimed rubber, but differs therefrom in that it may be dispersed without the employment of an additional dispersing agent.

The resulting or final plastic mass with the incorporated soap may now be dispersed in water by any approved mixer or instrumentality, by which water may be gradually worked into the plastic mass until a change of phase occurs and the rubber disperses in ultimate particle size in the aqueous medium. For example, the plastic rubber mass may be placed in a two-blade mixer of the "Werner and Pfleiderer" type, and after the mixer has been operated until the mass has reached the desired plastic consistency, water is slowly and gradually added, until the phase-change occurs and the rubber-compound is uniformly dispersed in the water. The resulting mass in consistency is a smooth paste like a smooth clay mud, and ordinarily has a water content of about 20% by weight. It may be diluted to any extent with water.

It is not necessary that the product resulting from the alkaline digestion should be washed and dried before being dispersed, for in some cases and for some purposes the reclaimed product may be transferred directly from the autoclave to the dispersing instrumentality, but inasmuch as the product on removal from the autoclave usually contains more or less dirt, and foreign matter, it is preferable to wash, dry, strain and otherwise refine it. Heat is not an essential factor in the dispersing operation, and the latter may be carried on at room temperatures, or at any desired temperature below the boiling point of water.

The reclaimed rubber with its contained soap may, prior to dispersion, have mixed and compounded homogeneously therewith on the usual compounding mill, not only sulphur, vulcanization accelerators of any kind, softeners, pigments, fillers, etc., but also considerable quantities of crude rubber, without affecting the capacity or property of dispersion in water without the addition of a colloid or other dispersing agent,—the soap incorporated in the operation of digestion being sufficient to act as a dispersing and stabilizing agent for the entire compounded mass. In fact, when the vulcanized rubber stock has been reclaimed according to the specific example hereinbefore given, we have successfully dispersed the mass, after 50% by weight thereof of crude rubber has been homogeneously compounded with the reclaimed soap-containing rubber mass.

In some cases, instead of compounding sulphur, pigments, such as whiting or zinc compounds, and vulcanization accelerators with the reclaimed rubber before dispersion, these may be incorporated in the aqueous dispersions after they are formed.

A paste consisting of the reclaimed rubber dispersed in water may be evenly spread on cloth or fabrics or used for the treatment of threads, cords or ropes. The reclaimed rubber, compounded with suitable softeners or other compounding ingredients, may be employed as a combining cement. When the paste dispersion, produced by the practice of the specific example herein given, is spread on fabric and dried, the resulting coagulated layer or film possesses tack and strength. The dispersed product, on drying and coagulation, may be vulcanized with the usual factors of vulcanization.

We are aware that in reclaiming rubber various oils and other softeners have been added to waste vulcanized rubber prior to the alkaline digestion, and that where such oils contained saponifiable matter some soap was adventitiously formed, but in such case there was no attempt to form soap or to ensure the retention in the digested mass, during the washing and refining operations, of a sufficient quantity of the soap to enable the product to be dispersed in water merely by manipulation of the mass in the presence of water and without the addition of a special dispersing agent for effecting the dispersion.

We are likewise aware of the fact, as pointed out by Lascelles-Scott, in "The India Rubber and Gutta Percha and Electrical Trade Journal," Vol. VI, No. 1, page 2, that a "rubber milk" containing a much lower percentage of dispersed rubber than latex may be prepared by using potassa-soap of rubber resins in dispersing a solution of crude rubber in an organic solvent, but our process of reclaiming vulcanized rubber differs greatly therefrom as will be readily seen, and likewise our product varies markedly from that described by Lascelles-Scott. For example, we are able to produce a reclaimed rubber, the aqueous dispersion of which has a rubber content of not less than twice that found in fresh *Hevea brasiliensis* latex, which may be diluted with water to have a rubber content from 80% by weight to that of the rubber latex.

What we claim is:

1. A process of reclaiming vulcanized rubber in a form capable of dispension in water without the addition of a dispersing agent, which comprises digesting under elevated temperature and pressure vulcanized rubber together with alkali and a quantity of saponifiable agent to form soap in situ in the mass sufficient to enable the resulting product of digestion to be dispersed in water by manipulation in the presence of water.

2. A process of reclaiming vulcanized rubber in a form capable of dispersion in water without the addition of a dispersing agent, which comprises digesting under elevated temperature and pressure vulcanized rubber together with alkali, a softener and a quantity of saponifiable agent to react with the alkali and form in situ a soap which in the final plastic product of digestion is sufficient to permit the mass to be dispersed in water by manipulation of the mass in the presence of water.

3. A process of reclaiming vulcanized rubber in a form capable of dispersion in water without the addition of a dispersing agent, which comprises digesting under elevated temperature and pressure the vulcanized rubber together with alkali, a softener and resin oil, whereby a plastic mass is produced comprising a soap formed in situ therein sufficient to permit dispersion of the mass in water by manipulation in the presence of water.

4. A process of reclaiming vulcanized rubber in a form capable of dispersion in water without the addition of a dispersing agent, which comprises digesting under elevated temperature and pressure the vulcanized rubber together with alkali and a quantity of saponifiable agent to form soap in situ in the mass sufficient to enable the resulting product of digestion to be dispersed in water by manipulation in the presence of water, and then washing and drying the mass without removal of the soap required for such dispersion.

5. A process of reclaiming vulcanized rubber in a form capable of dispersion in water without the addition of a dispersing agent, which comprises digesting under elevated temperature and pressure the vulcanized rubber together with alkali, a softener and a quantity of saponifiable agent to react with the alkali and form in situ a soap in the plastic product of digestion sufficient to permit the mass to be dispersed in water by manipulation of the mass in the presence of water, and then washing and drying the mass without removal of the soap required for such dispersion.

6. A process of reclaiming vulcanized rubber in a form capable of dispersion in water without the addition of a dispersing agent, which comprises digesting under elevated temperature and pressure the vulcanized rubber together with alkali, a softener and resin oil, whereby a plastic mass is produced comprising a soap formed in situ therein sufficient to permit dispersion of the mass in water by manipulation in the presence of water, and then washing and drying the mass without removal of the soap required for such dispersion.

7. A process of reclaiming vulcanized rubber in a form capable of dispersion in water without the addition of a dispersing agent, which comprises digesting under elevated temperature and pressure the vulcanized rubber together with alkali and a quantity of saponifiable agent to form soap in situ in the mass sufficient to enable the resulting product of digestion to be dispersed in water by manipulation in the presence of water, and finally manipulating the mass in the presence of water until the mass is dispersed in the water.

8. A process of reclaiming vulcanized rubber in a form capable of disperson in water without the addition of a dispersing agent, which comprises digesting under elevated temperature and pressure the vulcanized rubber together with alkali and a quantity of saponifiable agent to form soap in situ in the mass sufficient to enable the resulting product of digestion to be dispersed in water by manipulation in the presence of water, and finally gradually adding water to the reclaimed rubber mass during the manipulation of the mass, until the mass disperses in small particle size in the water.

9. A process of reclaiming vulcanized rubber in a form capable of dispersion in water without the addition of a dispersing agent, which comprises digesting under elevated temperature and pressure the vulcanized rubber together with alkali, a softener and a quantity of saponifiable agent to react with the alkali and form in situ a soap in the plastic product of digestion sufficient to permit the mass to be dispersed in water by manipulation of the mass in the presence of water, and finally gradually adding water to the reclaimed rubber mass during the manipulation of the mass, until the mass disperses in small particle size in the water.

10. A process of reclaiming vulcanized rubber in a form capable of dispersion in water without the addition of a dispersing agent, which comprises digesting under elevated temperature and pressure the vulcanized rubber together with alkali, a softener and resin oil, whereby a plastic mass is produced comprising a soap formed in situ therein sufficient to permit dispersion of the mass in water by manipulation in the presence of water, and finally gradually adding water to the reclaimed rubber mass during the manipulation of the mass, until the mass disperses in small particle size in the water.

11. A process of reclaiming vulcanized rubber in a form capable of being dispersed in water without the addition of a dispersing agent, which comprises removing the fabric from the vulcanized rubber by an acid, digesting under elevated temperature and pressure vulcanized rubber from which the fabric has thus been removed, together with a saponifiable material and a sufficient amount of alkali to neutralize the acid and to act as a saponifying agent to form soap in situ in the mass sufficient to enable the resulting product of digestion to be dispersed in water by manipulation in the presence of water.

12. A dry alkaline reclaimed vulcanized rubber stock, having incorporated therein and distributed therethrough sufficient soap formed in situ therein during the process of alkaline digestion to enable the reclaimed rubber mass to be dispersed in water without the addition of a dispersing agent.

13. A process of reclaiming vulcanized rubber, which comprises digesting the rubber under soap-forming conditions in the presence of an alkali and sufficient saponifiable agent to produce in situ throughout the resulting rubber mass sufficient soap to permit dispersion of the mass in water by manipulation in its presence, manipulating the resulting mass in the presence of water until the rubber is dispersed in the water, and coagulating the rubber from the aqueous medium.

14. An alkaline reclaimed vulcanized rubber stock having incorporated therein and distributed therethrough about 5% soap based on the total weight of the dry mass and formed in situ therein during the process of alkaline digestion, the reclaimed rubber mass being capable of dispersion by manipulation in the presence of water without the addition of other dispersing agents.

In testimony whereof we have affixed our signatures.

THOMAS G. RICHARDS.
GEORGE P. F. SMITH.